United States Patent [19]

Lawford

[11] 4,332,166
[45] Jun. 1, 1982

[54] TEMPERATURE COMPENSATION APPARATUS FOR A LIQUID FILLED CONDUIT

[75] Inventor: Victor N. Lawford, Pasadena, Calif.

[73] Assignee: International Telephone and Telegraph Corporation, New York, N.Y.

[21] Appl. No.: 176,466

[22] Filed: Aug. 8, 1980

[51] Int. Cl.³ .............................................. G01F 23/14
[52] U.S. Cl. ................................................... 73/299
[58] Field of Search .......................... 73/299, 301, 302

[56] References Cited

U.S. PATENT DOCUMENTS

| | | | |
|---|---|---|---|
| 2,747,404 | 5/1956 | Van Ham | 73/302 |
| 2,870,635 | 1/1959 | Vollbrecht et al. | 73/299 |
| 3,065,634 | 11/1962 | Kinderman | 73/302 |
| 3,232,111 | 2/1966 | Kinderman | 73/301 |
| 3,610,042 | 10/1971 | Brosius, Jr. | 73/299 |
| 3,853,006 | 12/1974 | Lawford | 73/301 |
| 4,019,387 | 4/1977 | Siegel | 73/299 |

Primary Examiner—Kyle L. Howell
Assistant Examiner—Joseph W. Roskos
Attorney, Agent, or Firm—A. Donald Stolzy

[57] ABSTRACT

A liquid level system having a bellows biased with a spring having a constant to add a variable force to a water column of a magnitude substantially equal to a loss in pressure resulting from an increase in water temperature. Such a system may also have high and low pressure connections to corresponding bellows and springs. The reference column may also be large in comparison to the remainder of the capillaries.

17 Claims, 5 Drawing Figures

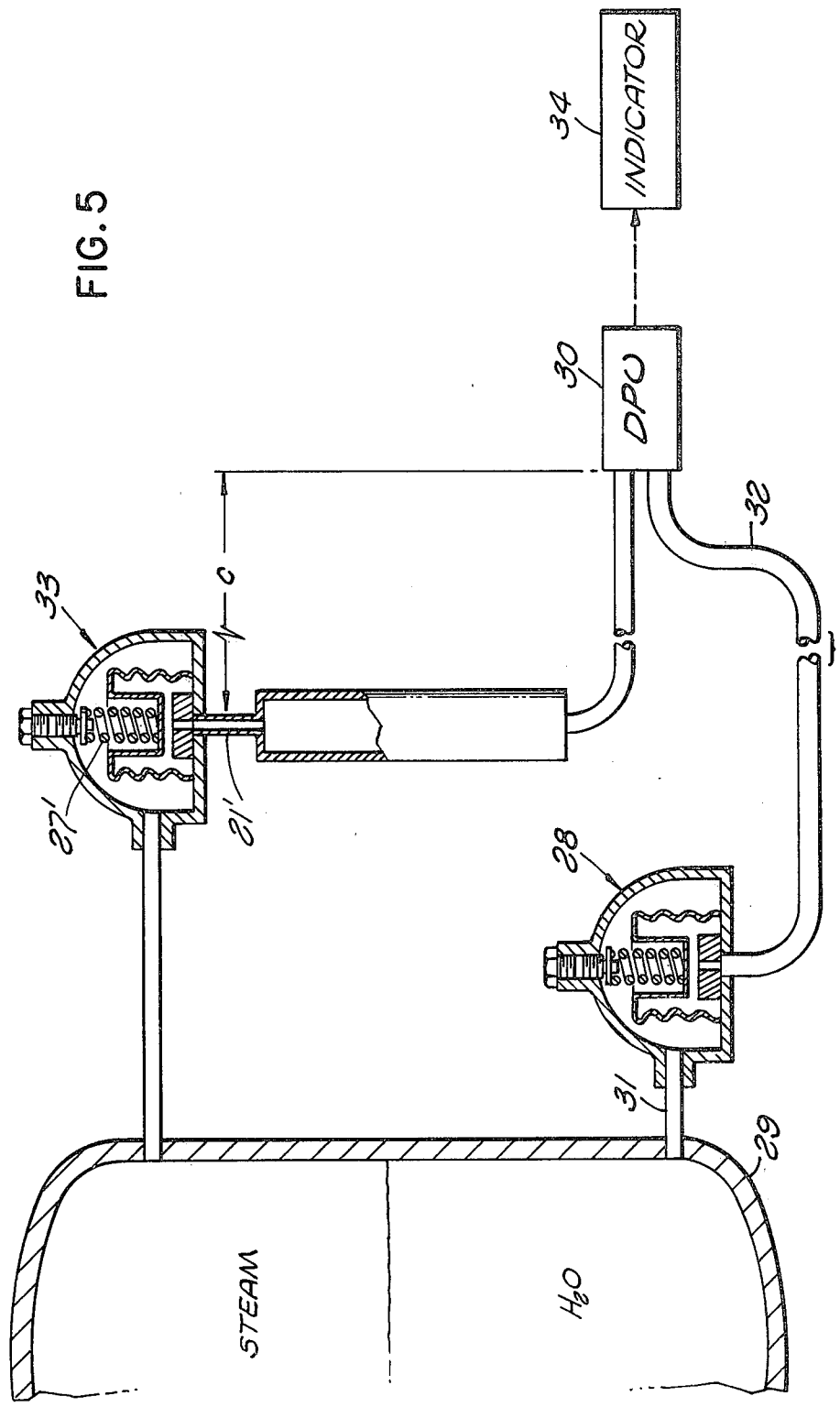

TEMPERATURE COMPENSATION APPARATUS FOR A LIQUID FILLED CONDUIT

BACKGROUND OF THE INVENTION

This invention relates to fluid sensing systems, and more particularly to pressure sensing apparatus having means for temperature compensation.

PRIOR ART STATEMENT

Typical of the prior art is a liquid level system disclosed in U.S. Pat. No. 3,853,006 issued Dec. 10, 1974.

A liquid level system of the above-mentioned type sometimes employs a differential pressure unit (DPU) of the types disclosed in U.S. Pat. Nos. 2,632,474 and 2,664,749 issued Mar. 24, 1953 and Jan. 5, 1954, respectively.

Fluid column inlets and outlets are provided for DPU's in the prior art. However, none of such columns are spring loaded or temperature compensated in that way.

SUMMARY

In accordance with the temperature compensation apparatus of the present invention, the above-described and other disadvantages of the prior art are overcome by providing means to vary the load on a liquid column in an amount to compensate for the change in the height and/or density thereof.

BRIEF DESCRIPTION OF THE DRAWINGS

In the accompanying drawings which illustrate exemplary embodiments of the present invention:

FIG. 5 is a diagrammatic view of an alternative embodiment of a liquid level system constructed in accordance with the present invention.

DESCRIPTION OF THE PREFERRED EMBODIMENTS

Figure 1:
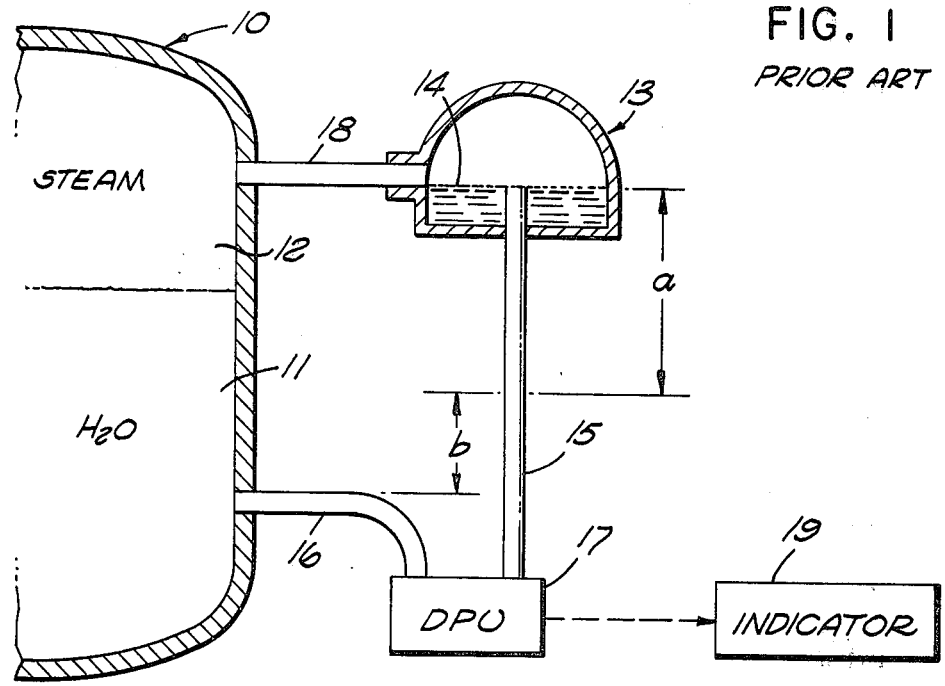
FIG. 1 is a diagrammatic view of a prior art liquid level system.

In FIG. 1, a tank 10 is provided to hold water 11 and steam 12 (perhaps at a pressure above 1.0 atmosphere).

A sensor 13 has water 14 therein that fills a capillary 15. Water 11 is carried from tank 10 by a capillary 16 to a differential pressure unit (DPU) 17. Capillary 15 is connected from sensor 13 to DPU 17. A capillary 18 connects tank 10 with sensor 13.

An indicator 19 is connected from DPU 17 to indicate the difference between the pressures inside capillaries 15 and 16. DPU 17 and indicator 19 are entirely conventional. If desired, the output of DPU 17 may be employed for process control or otherwise in lieu of indication.

Figure 2:
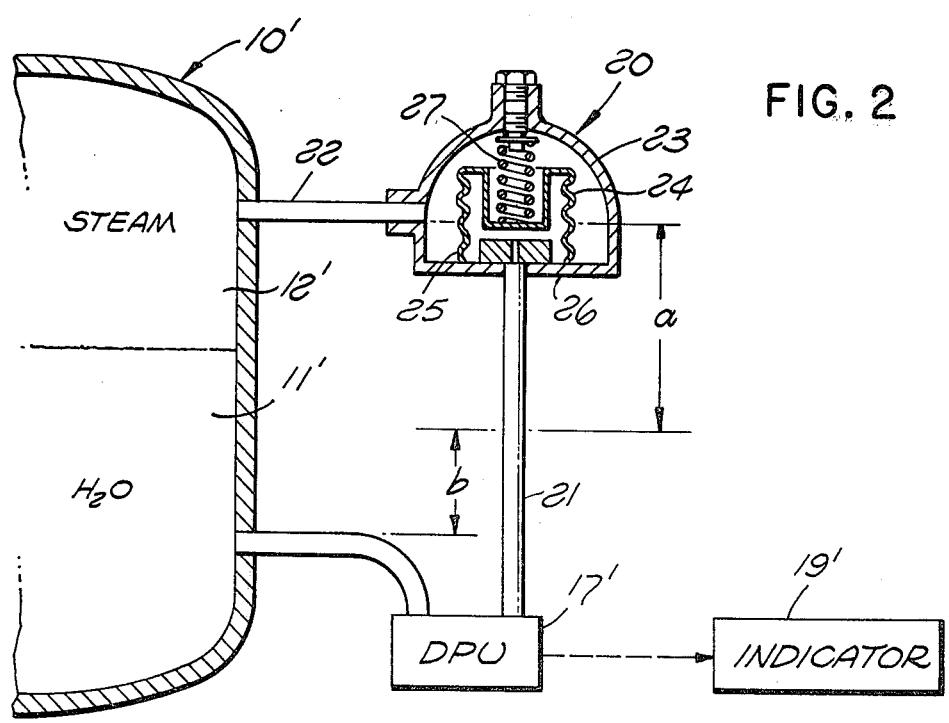
FIG. 2 is a diagrammatic view of one embodiment of a liquid level system constructed in accordance with the present invention.

The system of the invention shown in FIG. 2 may be identical to that shown in FIG. 1 except for sensor 13 and capillaries 15 and 18. In lieu of sensor 13, sensor 20 is provided in FIG. 2. Capillaries 21 and 22 are substituted for capillaries 15 and 18.

In shell 23 a low spring constant bellows 24 is provided having an annular lip 25 welded, liquid tight, to a plate 26.

Note will be taken that the inside diameter of capillary 21 is smaller than the inside diameter of lip 25. This means that when the water in capillary 21 expands due to an increase in ambient temperature and the temperature thereof, the bellows 24 will expand. The expansion of bellows 24, however, will not cause its upper end to move vertically by the same amount that water in capillary 21 has moved vertically near the upper end thereof.

A coiled spring 27 of a predetermined force constant resiliently resists upward movement of the upper end of bellows 24. The force constant is especially selected to effectively compensate for the change in specific gravity of the water in capillary 21 as will be explained.

Figure 3:
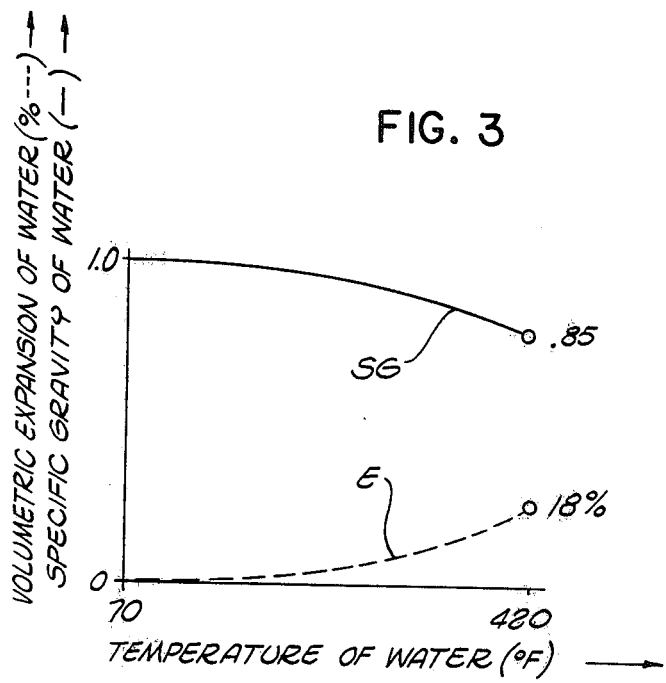
FIG. 3 is a graph of two functions (the specific gravity and expansion of water) of temperature.

Curves SG and E in FIG. 3 are specific gravity and volumetric expansion of water, respectively. Expansion in percent is defined as $$E = 100(1/SG - 1) \tag{1}$$

Figure 4:
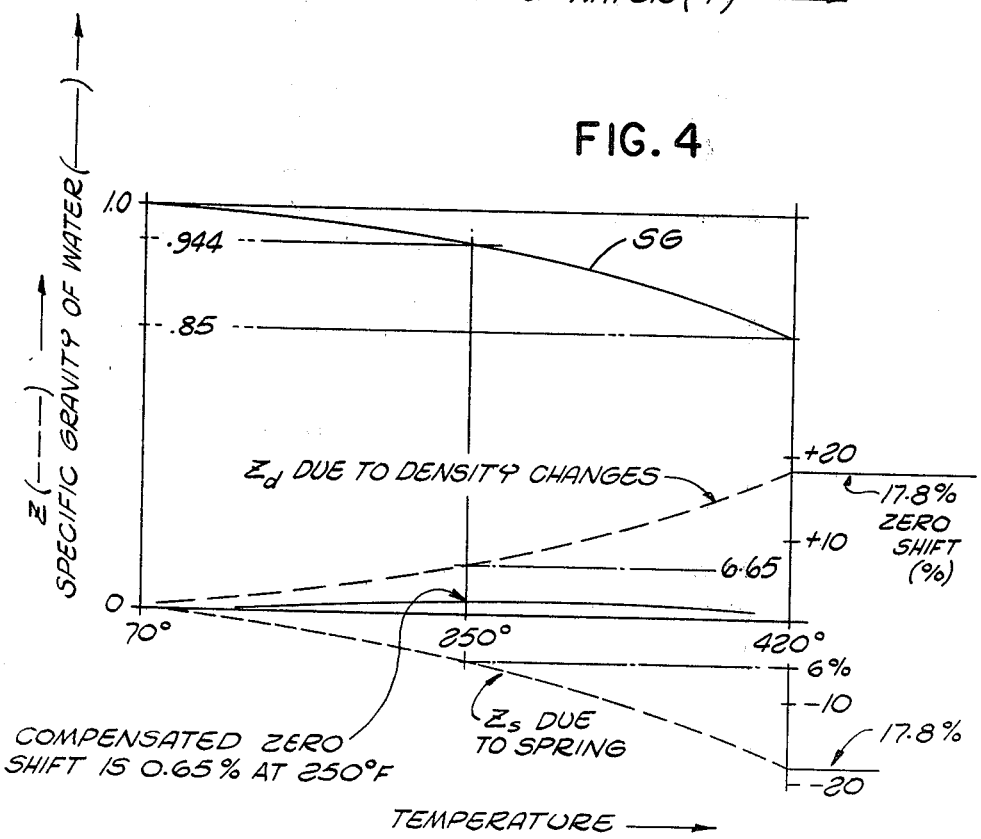
FIG. 4 is a graph of four functions of temperature, one of which is the specific gravity of water.

In FIG. 4 curve SG is the same as that in FIG. 3 on a somewhat different scale.

In FIG. 1, the reference column of water applies a hydrostatic pressure to DPU 17. If ambient temperature increases, the density of the column is reduced. The change in hydrostatic pressure causes indicator 19 to read "high".

If $$b = 0 \tag{2}$$

in FIG. 1, $$SG = 0.85 \tag{3}$$

The zero shift $Z_d$ would then be +15%.

DPU 17' and indicator 19' in FIG. 2 may be of the type disclosed in one of the said patents or Model 351 sealed system manufactured by ITT Barton, a division of the International Telephone and Telegraph Corporation.

Spring 27 is a calibrated spring on the sensor bellows 24. Spring 27 develops a "back-pressure" to the DPU 17'. As the water in capillary 21 expands due to an increase in temperature, the bellows 24 will extend upwardly against the spring and thus generate a "negative" Zero Shift at the DPU 17'.

The Zero Shift of FIGS. 1 and 2 may be calculated:

(a) at 70° F., the reference column hydrostatic pressure is $$p_o = (a+b)SG_o \tag{4}$$

in inches of water;

(b) at 420° F., $$P_t = P_o(SG_t) \tag{5}$$

$$P_t = (a+b)(SG_o)(SG_t) \tag{6}$$

(c) the Zero Shift Z(%) at the DPU is $$Z = (P_o - P_t)100/a \tag{7}$$

$$Z = [(a+b)SG_o](1 - SG_t) \times 100 \times 1/a \tag{8}$$

If L is the change in the length of the bellows (ratio of the change in the volume of water dV to the effective area A of bellows 24), $$L = dV/A \quad (9)$$

$$dV = V(E/100) \quad (10)$$

$$L = VE/100A \quad (11)$$

To determine the spring rate K of spring 27 in force (pounds) per stroke (inches), $$K = PA/L \quad (12)$$

$$P = aZ/2774 \quad (13)$$

(27.74 is a water column at 70° F. for a psi conversion).

$$K = aZA/2774L$$

or $$K = \frac{K_o A^2 [(a + b)SG_o][1 - SG_t]}{(V)\left(\frac{1}{SG_t} - 1\right)}$$

where, for example, $$K_o = 2.03/A^2 \quad (15)$$

The value of K may be determined in one of many specific cases, e.g. as follows:
a = 80" span
b = 15" suppression
V = 15. cu. in. in system
t = 420° F.
(a) Basic System (No Spring)
Z (from equation 8):

$$Z = ([(95)1](1 - 0.85)/80) \times 100 \quad (16)$$

Z = +17.8% This is the zero shift for non-compensated system.
(b) Compensated System [see equation (14)]:

$$K = \frac{2.03\,[(95)\,1]\,(1 - .85)}{15\,(.176)}$$

K = 10.96 lbs./inch.
(c) Check (b).
(1) dV = 15 (0.176) = 2.64 cu in H$_2$O
(2) L = 0.352" bellows extension (spring compression)
(3) Force to compress spring = 3.86 lbs
(4) Pressure in sensor bellows = 0.515 psi, or 14.27 inches of H$_2$O
(5) Z' = zero shift of instrument due to pressure in sensor bellows = 14.27/80 = −17.8%. This value cancels (17).
Comments:
(a) Water sp. gr. valves are based on "saturated" conditions.
(b) Hydrostatic pressure from bellows extension is omitted.
(c) Expansion of tubing inside diameter is omitted.
(d) Effect of Modulus change on metals is omitted.
(e) Springs can be made non-linear to "fully compensate."
(f) Testing the design can be performed on upright unit,
(1) Cold: inject volume of water equal to dV.
(2) Hot: apply heat by heating-elements, or jacket.

The system of FIG. 5 may be identical to that of FIG. 2, except that the major vertical portion of capillary 21' has a quite large inside diameter compared to that of all other capillary portions, C is quite long, and a sensor 28 is connected from tank 29 to a DPU 30 with capillaries 31 and 32. Moreover, sensor 28 may be identical to sensor 33 or to sensor 20, if desired, with, for example, spring 27' or spring 27. Indicator 34 may be identical to indicator 19', if desired.

The large diameter of the said capillary portion of capillary 21' makes its rate of change of water expansion large in comparison to the rate of change thereof in the small diameter capillary portions over distance C. The vertical portion thus "swamps out" the small capillaries and accurately show the correct pressure.

In FIG. 5, the spring of sensor 28 balances out any error due to common temperature in the capillaries connected to DPU 30.

The enlargement in the bellows reduces the amount of water it takes to expand the bellows and vice versa.

The plug in each case may be removed for access.

The spring compression at a starting point may be adjusted by the threaded member.

Note will be taken that a piston with an O-ring seal may be substituted for any one of the bellows disclosed herein.

The phrase "expansion contraction means" or any other phase may be equivalent to a bellows, a piston or any other equivalent.

Any coiled spring disclosed herein may be any type of spring including but not limited to a leaf spring.

A spring containing sensor may be connected at the high pressure inlet of a DPU to the low pressure inlet thereto, or one to the high pressure inlet and another to the low pressure inlet. In FIG. 1, for example, the lower ends of capillaries 16 and 15 are the high pressure and low pressure inlets, respectively.

What is claimed is:
1. A temperature compensated fluid link comprising: fluid tight housing means providing a chamber, said housing means having an inlet to admit fluid under pressure to the interior of said chamber, said housing means having one wall and an opening extending through said one wall; a conduit having first and second ends, said first end of said conduit being sealed through said opening in a liquid tight manner; a bellows having a free end and a lip at an opposite end, said lip being sealed to a side of said one wall inside said chamber around and spaced from said chamber opening; a spring supported in said chamber in a manner to apply a force to said bellows free end as a function of the expansion and contraction of said bellows relative to said opening; pressure sensitive means providing a liquid tight closure of said second conduit end; and an incompressible liquid filling said bellows and said conduit, said incompressible liquid having an expansion which is a predetermined function of temperature, said spring having a force constant of a magnitude sufficient to cause the pressure in said conduit at said pressure sensitive means to be constant not only when the pressure outside said bellows but inside said chamber is constant, but also when the temperature of said liquid varies a predetermined extent anywhere within a predetermined range.

2. A liquid level system comprising: first fluid tight housing means providing a chamber; a tank to hold a liquid, said first housing means having an inlet means connected from said tank to admit fluid under pressure to the interior of said chamber, said first housing means having one wall and an opening extending through said one wall; a conduit having first and second ends, the first end of said conduit being sealed through said opening in a liquid tight manner; a bellows having a lip at one end sealed to a side of said one wall inside said chamber around and spaced from said chamber opening; a spring supported in said chamber in a manner to apply a force to said bellows, said force being a function of the expansion and contraction of said bellows relative to said opening; pressure sensitive means providing a liquid tight closure of said second conduit end; an incompressible liquid filling said bellows and said conduit, said incompressible liquid having an expansion which is a predetermined function of temperature, said spring having a force constant of a magnitude sufficient to cause the pressure at said pressure sensitive means to be substantially constant not only when the pressure outside said bellows but inside said chamber is constant, but also when the temperature of said liquid varies a predetermined extent anywhere within a predetermined range, said pressure sensitive means including a differential pressure unit (DPU); conduit means connected from said tank to said DPU below said first housing means inlet; and utilization means connected from said DPU.

3. The invention as defined in claim 2, wherein said utilization means includes means to indicate the excess of pressure in said conduit over that in said conduit means.

4. The invention as defined in claim 3, wherein said spring has a force constant K, where $$K = \frac{[K_o][A^2][(a+b)SG_o][1-SG_t]}{V\left[\frac{1}{SG_t} - 1\right]}$$

$K_o$, A, a, b and V are constants, $SG_o$ is the specific gravity of said incompressible liquid at a predetermined lower temperature, $SG_t$ is the specific gravity of said incompressible liquid at a predetermined higher temperature.

5. The invention as defined in claim 4, wherein $SG_o$ is dimensionless, $SG_t$ is dimensionless, $K_o$ converts K to units of force per unit of bellows deflection, a is linear measure, b is linear measure, V is the volume of water that is exposed to ambient temperatures, and A is the bellows effective area.

6. The invention as defined in claim 4, wherein the expression (100)(a/a+b)

is the span as a percent of total span, and V is the volume of water that is exposed to ambient temperatures.

7. The invention as defined in claim 6, wherein $K_o = 1/27.74$,

A=7.5 square inches (typical), and K is in pounds per inch.

8. The invention as defined in claim 6, wherein $SG_o=1$ and $SG_t$ is specific gravity above 300° F.

9. The invention as defined in claim 8, wherein $SG_t$ is specific gravity at 420° F., and $SG_o$ is specific gravity at 70° F.

10. The invention as defined in claim 2, wherein said conduit means includes second fluid tight housing means substantially identical to said first housing means and having structure inside thereof substantially identical to that inside said first housing means.

11. The invention as defined in claim 10, wherein a portion of said conduit is proximity to said first housing means is larger in diameter than the remainder thereof.

12. The invention as defined in claim 11, wherein said utilization means includes a differential pressure indicator.

13. The invention as defined in claim 2, wherein said spring has a force constant K, where $$K = \frac{[K_o][A^2][(a+b)SG_o][1-SG_t]}{V\left[\frac{1}{SG_t} - 1\right]}$$

$K_o$, A, a, b and V are constants, $SG_o$ is the specific gravity of said incompressible liquid at a predetermined lower temperature, $SG_t$ is the specific gravity of said incompressible liquid at a predetermined higher temperature.

14. The invention as defined in claim 13, wherein $SG_o$ is dimensionless, $SG_t$ is dimensionless, $K_o$ converts K to units of force per unit of bellows deflection, a is linear measure, b is linear measure, V is the volume of water that is exposed to ambient temperatures, and A is the bellows effective area.

15. A liquid level system comprising: first fluid tight housing means providing a chamber; a tank to hold a liquid, said first housing means having inlet means connected from said tank to admit fluid under pressure to the interior of said chamber, said first housing means having one wall and an opening extending through said one wall; a conduit having first and second portions with respective first and second ends, the first end of said first conduit portion being sealed through said opening in a liquid tight manner; a bellows having a lip at one end sealed to a side of said one wall inside said chamber around and spaced from said chamber opening; a spring supported in said chamber in a manner to apply a force to said bellows, said force being a function of the expansion and contraction of said bellows relative to said opening; pressure sensitive means providing a liquid tight closure of the second end of said second conduit portion; an incompressible liquid filling said bellows and said conduit, said incompressible liquid having an expansion which is a predetermined function of temperature, said spring having a force constant of a magnitude sufficient to cause the pressure at said pressure sensitive means to be substantially constant not only when the pressure outside said bellows but inside said chamber is constant, but also when the temperature of said liquid varies a predetermined extent anywhere within a predetermined range, said pressure sensitive means including a differential pressure unit (DPU); conduit means connected from said tank to said DPU below said first housing means inlet; and utilization means connected from said DPU, said conduit portion with said first end having an inside cross sectional area several times larger than that having said second end.

16. The invention as defined in claim 15, wherein said conduit means includes a sensor having second housing means the same as said first housing means and all the structure contained therein.

17. A liquid level system comprising: first fluid tight housing means providing a chamber; a tank to hold a liquid, said first housing means having an inlet means connected from said tank to admit fluid under pressure to the interior of said chamber, said first housing means having one wall and an opening extending through said one wall; a conduit having first and second ends, the first end of said conduit being sealed through said opening in a liquid tight manner; a bellows having a lip at one end sealed to a side of said one wall inside said chamber around and spaced from said chamber opening; a spring supported in said chamber in a manner to apply a force to said bellows, said force being a function of the expansion and contraction of said bellows relative to said opening; pressure sensitive means providing a liquid tight closure of said second conduit end; an incompressible liquid filling said bellows and said conduit, said incompressible liquid having an expansion which is a predetermined function of temperature, said spring having a force constant of a magnitude sufficient to cause the pressure at said pressure sensitive means to be substantially constant not only when the pressure outside said bellows but inside said chamber is constant, but also when the temperature of said liquid varies a predetermined extent anywhere within a predetermined range, said pressure sensitive means including a differential pressure unit (DPU); conduit means connected from said tank to said DPU below said first housing means inlet; and utilization means connected from said DPU, said conduit means including a sensor having second housing means the same as said first housing means and all the structure contained therein.

* * * * *